(12) United States Patent
Santos-Greiner et al.

(10) Patent No.: US 11,328,117 B2
(45) Date of Patent: May 10, 2022

(54) AUTOMATED CONTENT MODIFICATION BASED ON A USER-SPECIFIED CONTEXT

(71) Applicant: International Business Machines Corporation, Armonk, NY (US)

(72) Inventors: Stefany Santos-Greiner, Munich (DE); Alecio Pedro Delazari Binotto, Munich (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/876,100

(22) Filed: May 17, 2020

(65) Prior Publication Data

US 2021/0357578 A1   Nov. 18, 2021

(51) Int. Cl.
| | |
|---|---|
| *G06F 17/00* | (2019.01) |
| *G06F 40/169* | (2020.01) |
| *G06F 16/93* | (2019.01) |
| *G06F 40/30* | (2020.01) |
| *G06N 5/02* | (2006.01) |
| *G06N 20/00* | (2019.01) |
| *G06F 16/23* | (2019.01) |

(52) U.S. Cl.
CPC ........ *G06F 40/169* (2020.01); *G06F 16/2365* (2019.01); *G06F 16/93* (2019.01); *G06F 40/30* (2020.01); *G06N 5/02* (2013.01); *G06N 20/00* (2019.01)

(58) Field of Classification Search
CPC .......... G06N 20/20; G06N 20/00; G06N 5/02; G06F 40/169; G06F 16/93; G06F 16/2365; G06F 40/30
See application file for complete search history.

(56) References Cited

U.S. PATENT DOCUMENTS

| | | | |
|---|---|---|---|
| 6,137,911 A | * | 10/2000 | Zhilyaev ............... G06F 16/353 382/225 |
| 6,919,901 B2 | | 7/2005 | Detrick |
| 8,740,703 B2 | | 6/2014 | Hirose |
| 9,195,646 B2 | | 11/2015 | Tsuchida |

(Continued)

FOREIGN PATENT DOCUMENTS

| | | |
|---|---|---|
| WO | 20080766002 A2 | 6/2008 |
| WO | 2020039121 A1 | 2/2020 |

OTHER PUBLICATIONS

"Generative Adversarial Networks", Google Developers, Last updated Oct. 8, 2019, 1 page, <https://developers.google.com/machine-learning/gan>.

(Continued)

*Primary Examiner* — Mohammed H Zuberi
(74) *Attorney, Agent, or Firm* — Michael A. Petrocelli

(57) ABSTRACT

Dynamically changing a content based on a user-defined context includes receiving, by one or more processors, input data from a user, the input data includes at least one document with an annotated part identifying a first content element, the first content element is associated with a first content type. The one or more processors determine a context information associated with the annotated part and extract the annotated part. A first replacement for the first content element is retrieved from a first data source selected based on the content information. The one or more processors replace the first content element in the at least one document with the first replacement.

15 Claims, 6 Drawing Sheets

(56) References Cited

U.S. PATENT DOCUMENTS

| | | | |
|---|---|---|---|
| 9,529,699 B2 | 12/2016 | Rajan | |
| 9,996,771 B2 | 6/2018 | Clayton | |
| 2004/0024739 A1* | 2/2004 | Copperman | G06F 16/367 |
| | | | 707/E17.084 |
| 2007/0189600 A1* | 8/2007 | Shi | G06V 10/457 |
| | | | 382/159 |
| 2007/0270978 A1* | 11/2007 | Shi | G06T 1/005 |
| | | | 707/E17.02 |
| 2008/0005678 A1* | 1/2008 | Buttner | G06F 3/0481 |
| | | | 715/744 |
| 2008/0168135 A1* | 7/2008 | Redlich | G06F 16/26 |
| | | | 709/204 |
| 2009/0208118 A1* | 8/2009 | Csurka | H04N 1/3873 |
| | | | 382/228 |
| 2010/0005106 A1* | 1/2010 | Carter | G06F 16/955 |
| | | | 707/E17.112 |
| 2013/0031457 A1* | 1/2013 | Griffiths | G06F 40/169 |
| | | | 715/231 |
| 2015/0007086 A1* | 1/2015 | Weitzman | G06F 3/0484 |
| | | | 715/772 |
| 2016/0062985 A1* | 3/2016 | Epstein | G06F 40/216 |
| | | | 704/9 |
| 2017/0040016 A1 | 2/2017 | Cui | |

OTHER PUBLICATIONS

Charalambous, et al., "A data augmentation methodology for training machine/deep learning gait recognition algorithms", arXiv:1610.07570v1 [cs.CV] Oct. 24, 2016, 12 pages, <https://arxiv.org/abs/1610.07570>.

Felzenszwalb, et al., "Efficient Graph-Based Image Segmentation", International Journal of Computer Vision, vol. 59, Sep. 2014, pp. 167-181, <https://doi.org/10.1023/B:VISI.0000022288.19776.77>.

Glez-Pena, et al., "Web scraping technologies in an API world", Briefings in Bioinformatics, vol. 15, No. 5, pp. 788-797, <https://doi.org/10.1093/bib/bbt026>.

Kobayashi, Sosuke, "Contextual Augmentation: Data Augmentation by Words with Paradigmatic Relations", augarXiv:1805.06201v1 [cs.CL] May 16, 2018, 6 pages, <https://arxiv.org/abs/1805.06201>.

Liu, Bing, "Sentiment Analysis and Opinion Mining", Synthesis Lectures on Human Technologies, Morgan & Claypool Publishers, Apr. 22, 2012, 168 pages, <https://www.cs.uic.edu/~liub/FBS/SentimentAnalysis-and-OpinionMining.pdf>.

Liu, et al., "Unsupervised Image-to-Image Translation Networks", 31st Conference on Neural Information Processing Systems (NIPS 2017), arXiv:1703.00848v6 [cs.CV] Jul. 23, 2018, 11 pages.

Mao, et al., "The Neuro-Symbolic Concept Learner: Interpreting Scenes, Words, and Sentences From Natural Supervision", arXiv:1904.12584v1 [cs.CV] Apr. 26, 2019, 28 pages, <https://arxiv.org/pdf/1904.12584.pdf>.

Mell et al., "The NIST Definition of Cloud Computing", National Institute of Standards and Technology, Special Publication 800-145, Sep. 2011, 7 pages.

Muhammad, et al., "Hair detection, segmentation, and hairstyle classification in the wild", Image and Vision Computing, vol. 71, Mar. 2018, pp. 25-37, <https://doi.org/10.1016/j.imavis.2018.02.001>.

Pont-Tuset, et al., "Semi-Automatic Video Object Segmentation by Advanced Manipulation of Segmentation Hierarchies", 13th International Workshop on Content-Based Multimedia Indexing (CBMI), 2015, 6 pages, <https://ieeexplore.ieee.org/document/7153600>.

Shorten, et al., "A survey on Image Data Augmentation for Deep Learning", Journal of Big Data, vol. 6, Article No. 60, Jul. 6, 2019, 48 pages, <https://link.springer.com/article/10.1186/s40537-019-0197-0>.

Taveekarn, et al., "DATA++: An Automated Tool for Intelligent Data Augmentation Using Wikidata", 16th International Joint Conference on Computer Science and Software Engineering (JCSSE), 2019, 6 pages, <https://ieeexplore.ieee.org/document/8864152>.

* cited by examiner

AUTOMATED CONTENT MODIFICATION BASED ON A USER-SPECIFIED CONTEXT

BACKGROUND

The present invention generally relates to the field of artificial intelligence, and more particularly to a method, system, and computer program product for dynamically changing a content based on a user-specified context.

Document analytics can help users extract meanings, patterns, and structure hidden in unstructured data. Documents can include books, emails, transcribed conversations, contracts, letters, and the like. A text can be a piece of writing included in the document, that is often accompanied by multimodal data such as images, videos, audio, etc. Nowadays, there is an increasing interest in the analysis of unstructured data from documents to obtain potentially valuable insights or automate workflows. However, training machine-learning algorithms for performing fast and accurate data analysis and content prediction from unstructured data may require large amounts of data. Moreover, depending on the context, data availability for training machine-learning algorithms can be limited or scarce. Therefore, improved techniques for dynamic content modification would be desirable.

SUMMARY

Shortcomings of the prior art are overcome and additional advantages are provided through the provision of a computer-implemented method for dynamic content modification. The method includes receiving, by one or more processors, input data from a user, the input data including at least one document with an annotated part identifying a first content element, the first content element including a first content type. A content information associated with the annotated part is determined by the one or more processors. The annotated part is extracted and a first replacement for the first content element is retrieved from a first data source based on the context information. The first content element in the at least one document is replaced with the first replacement.

Another embodiment of the present disclosure provides a computer program product based on the method described above.

Another embodiment of the present disclosure provides a computer system based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Machine learning is a form of artificial intelligence (AI) that enables a system to learn from data rather than through explicit programming. As the algorithms ingest training data, it is then possible to produce more precise models based on that data. A machine-learning model is the output generated when a machine-learning algorithm is trained with data. After training, the model is provided with an input and an output will be given to user(s). For example, a predictive algorithm will create a predictive model. Then, when users provide the predictive model with data, they will receive a prediction based on the data that trained the model. The process of training machine-learning algorithms typically requires large amounts of data. Depending on the context, data availability for training machine-learning algorithms can be limited or scarce.

Therefore, embodiments of the present invention provide a method, system, and computer program product for dynamically changing a content based on a user-specified context. The following described exemplary embodiments provide a system, method, and computer program product to, among other things, multiply data associated with a specific context provided by a user. Specifically, embodiments of the present disclosure may receive multimodal input data (e.g., text, images, or videos) from the user including annotated features that can be changed or augmented, extract content associated with the annotated features, and aggregate the extracted content to the context to dynamically generate a new content. Based on the context specified by the user, the annotated data can be extracted on-demand and dynamically modified or replaced with content from internal or external data sources (e.g., weather forecasts, news, social-media, etc.). Thus, the present embodiments have the capacity to improve the technical field of AI by generating new (synthetic) data based on a user-specified context from different databases containing actual, and possibly real-time, data associated with the context to create a training knowledge base that can be automatically enriched to serve machine-learning models.

Figure 1:
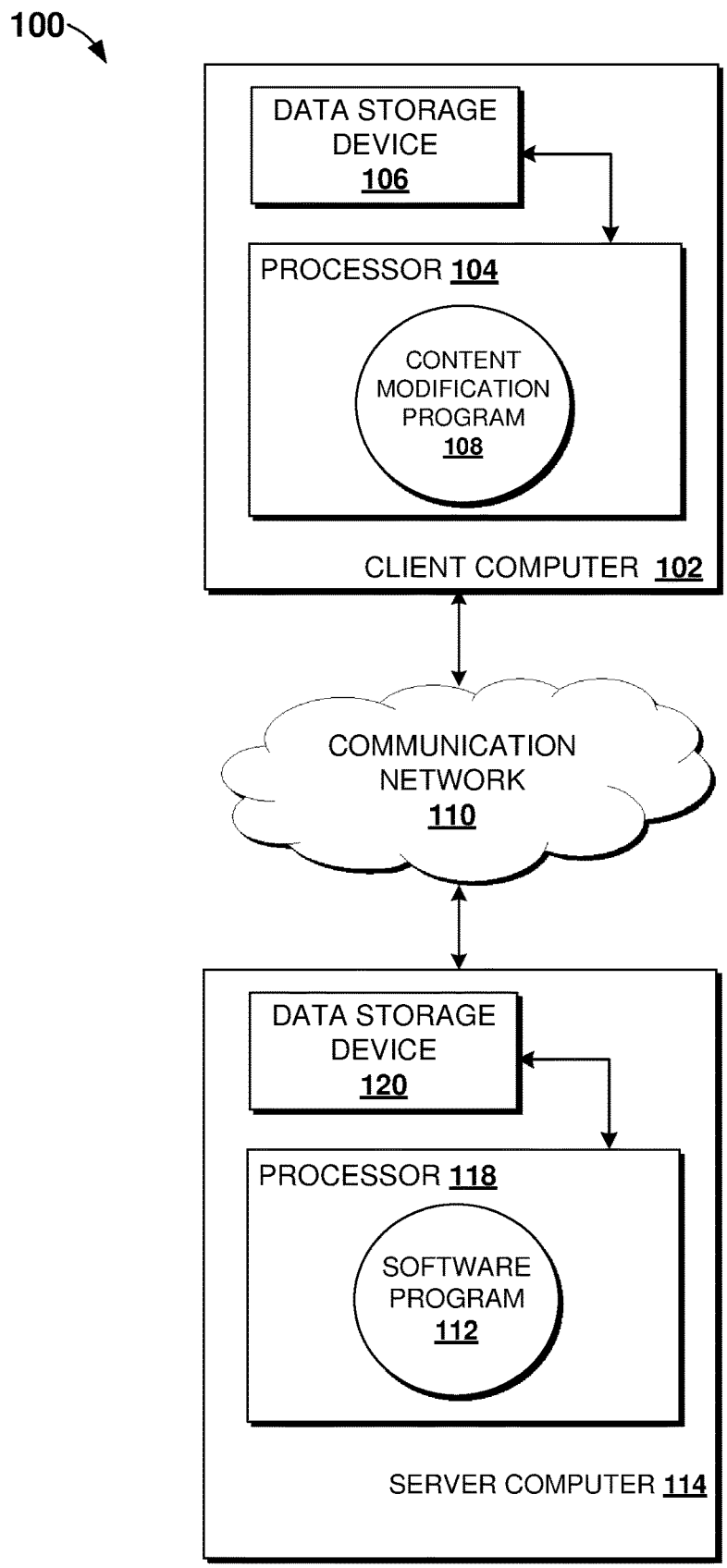
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a content modification program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The content modification program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
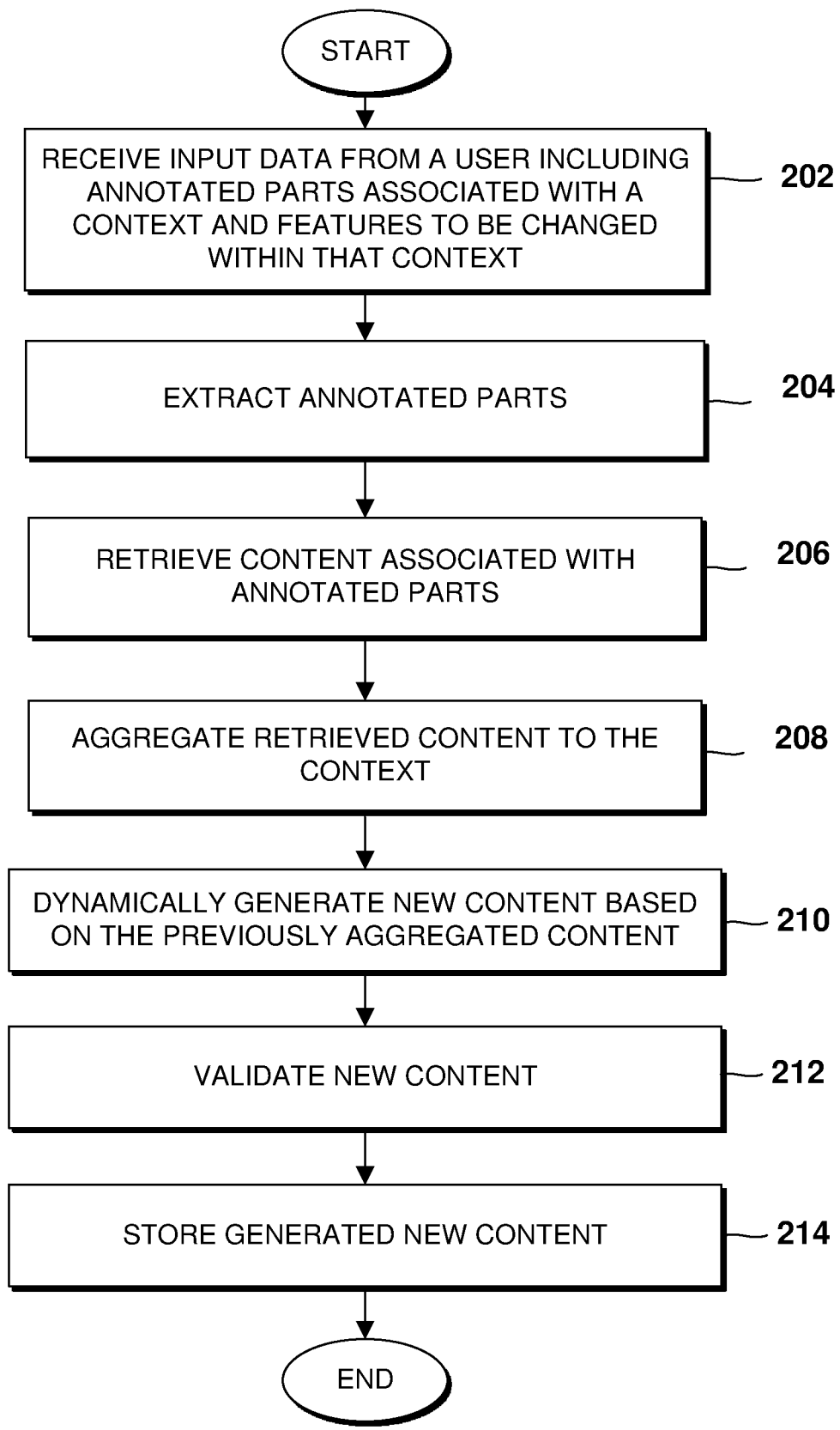
FIG. 2 depicts a flowchart illustrating the steps of a computer-implemented method for dynamic content modification based on a user-specified context, according to an embodiment of the present disclosure.

Referring now to FIG. 2, a flowchart illustrating the steps of a computer-implemented method for dynamically changing a content based on a user-specified context is shown, according to an embodiment of the present disclosure.

The method starts at step 202. At this step, input data is received from a user. In an embodiment, the input data may include at least one document through which the user defines a certain context. The at least one document may include multimodal data such as, but not limited to, text, images, audio, or videos.

The at least one document includes annotations explicitly marking or identifying parts corresponding to one or more content elements or features (hereinafter referred to as "content elements") that should be changed by the content modification program 108 (FIG. 1) to generate a number n of different variations of the content elements given by the user. According to an embodiment, in addition to annotating parts of the input data, the user also defines a contextual variation. For instance, in embodiments in which the at least one document includes a sentence in which a word needs to be replaced, the user marks the word to be changed and defines the context associated with that the word.

Annotated parts of the input data corresponding to the content elements the user wants to have different variations of are automatically extracted at step 204. According to an embodiment, exactly at the locations from which the annotated data is extracted, new contextual data, retrieved at step 206, will be used to fill these locations with replacement content elements associated with the context. Examples of the extracted data may include a weather condition within a sentence, an object in a picture, a landscape within a video, etc.

More particularly, at step 206, content elements associated with the extracted annotated parts are retrieved from external and/or internal data sources (hereinafter referred to as "data sources") or information systems to obtain new data that can be used to replace the original (input) data provided by the user. Stated differently, replacement content elements associated with the annotated parts are retrieved from different data sources and used to change the content elements initially given by the user. According to an embodiment, replacement content elements will substitute the annotated parts extracted from the at least one document (i.e., initial input data) provided by the user.

The content retrieval process includes one or more searches in different data sources using well known crawling and web scraping techniques. It can be understood that the searches performed in the data sources for replacement content elements retrieval are driven by the user's annotations in the original input data. Examples of data sources may include applications which are used within a company, a database which is specifically set up to collect input data for a particular model, or publicly available data such as weather forecasts, events in a city, traffic reports, social media sites, etc.

According to an embodiment, the user may specify a leading variable that drives the search for replacement content elements associated with the given context. The user may also specify a lagging variable that will be updated based on the results obtained from the leading variable search. Based on the retrieved data, tuples (pairs) are built, and known techniques for similarity scoring can be implemented to classify, score, and rank the tuples in order to provide a plurality of replacement options. For example, a first (highly ranked) tuple can be selected as the replacement content element that will substitute the annotated one. The different content variations must match the context given by the user.

The user can select the order of representation or set a default mode. For example, in some embodiments, the leading variable driving the search can be a text and the lagging variable an image. In other embodiments, the leading variable can be an image or multimodal file with metadata (e.g., JPEG images, Medical DICOM images, etc.) and the lagging variable a text accompanying the image. For instance, a reversed image search process can be implemented to find replacement element contents (e.g., text or additional images) from the initial image. As mentioned above, after a replacement content is found both leading and lagging variables must match the context specified by the user in the original input data.

At step 208, the retrieved replacement content elements from the different data sources are aggregated to the user-defined context. At step 210, based on the aggregated replacement content, new content elements can be selected to replace the initial input data provided by the user. In some embodiments, the new content elements can be a mix of multimodal data including, for example, text, images, videos, and the like. The annotated parts identified by the user at step 202 will be replaced with the new content, as will be described in the exemplary embodiment of FIG. 3.

At step 212, validation of the new content elements is performed to assure that they correspond to the user-specified context. Stated differently, the new content elements are validated to confirm that they make sense within the user-specified context. In embodiments in which the new content elements are included within a written text; a spelling and grammar check algorithm can be used to validate the new content elements. In embodiments in which an image is changed to incorporate the new content elements or to match changes to the written text, the content validation process can be conducted by using, for example, neuro-symbolic concept learning or image inpainting.

At step 214, the new content elements can be stored in, for example, a synthetic database. The new content elements can be stored for later use as, for example, a training dataset or a different purpose. It should be noted that as new content elements are generated and stored, large amounts of data associated with the user-specified context become available and can be retrieved by the user for personal machine-learning projects. It should also be noted that the generated data is envisioned to be secured and not shared with anyone without consent.

Figure 3:
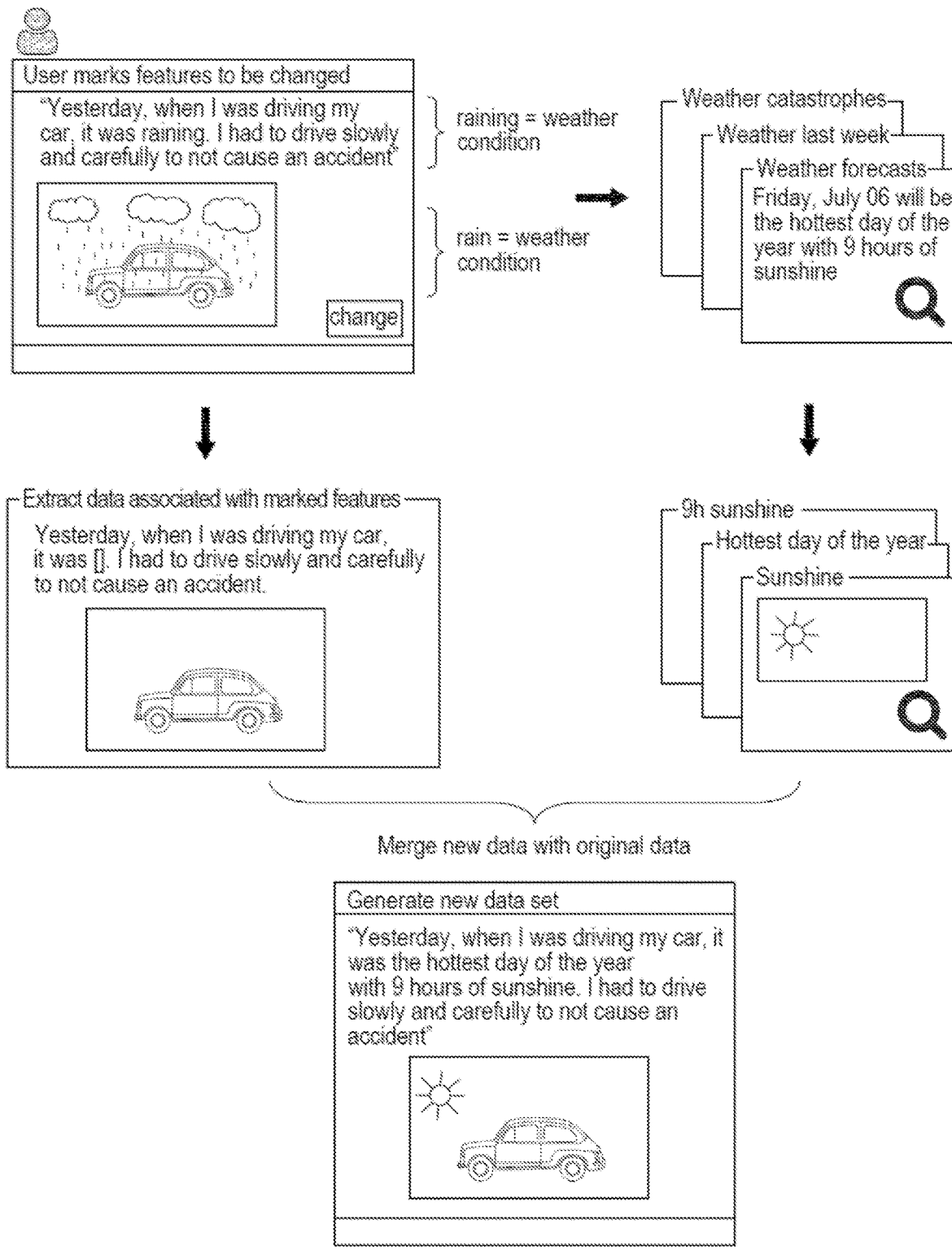
FIG. 3 is an exemplary implementation of the proposed computer-implemented method for dynamic content modification based on a user-specified context, according to an embodiment of the present disclosure.

Referring now to FIG. 3, an exemplary implementation of the computer-implemented method for dynamic content modification based on a user-specified context of FIG. 2 is shown, according to an embodiment of the present disclosure.

In this example, a user provides initial input data consisting of a at least one document. The at least one document includes a first content element with a first content type and a second content element associated with the first content element with a second content type. The first content type includes a text and the second content type includes an image. The first content element and the second content element are associated with a context information specified in the at least one document.

In this example, the context information is related to a person driving a car during a certain weather condition. The goal of the user is to generate n different versions of the specified content elements. As shown in the figure, the user selects the word "raining" as the annotated part of the input data. The annotated word "raining" is the first content element (leading variable) associated with the context information "weather condition". It should be noted that only the annotated word "raining" can be changed during the content modification process.

The annotated word "raining" is automatically identified as belonging to the category "weather condition". However, it should be noted that if it is determined that the automatically identified category does not match the word (i.e., annotated content element), the mismatch can be corrected by the user so it matches the annotated word.

Similarly, the image accompanying the written text is the second content element (lagging variable) associated with the first content element, and hence with the context information "weather condition". The second content element also needs to be annotated by the user in order to be changed. According to an embodiment, the image is clustered by known algorithms such as nearest neighbor graphs or hierarchies for image segmentation. By doing this, different objects identified by the algorithm within the image can be shown to the user and a selection can be made of the desired objects to be replaced. The user may also make adjustments if the object to be replaced has not been identified correctly.

As described above with reference to FIG. 2, after performing a search for the leading variable (word "raining"), the features in the image or second content element related to the weather condition "rain" will be replaced during the process. Specifically, the clouds and raindrops corresponding to a background of the image provided by the user will be changed according to a replacement word (content) associated with the context information "weather condition". By doing this, the new (synthetic) data is generated based on the user-specified context.

Searches are conducted in user-defined data sources. In the exemplary embodiment of FIG. 3, external websites can be used to find replacement content elements corresponding to the word "raining", i.e., related to different weather conditions. For example, an external data source can be The Weather Channel® website. This external data source is scraped for information on different weather conditions. According to an embodiment, different weather conditions will be scraped and added to the original sentence to replace the word "raining".

In this example, the annotated textual content "raining" is replaced with "hottest day of the year with 9 hours of sunshine". Then, an image associated with the new weather condition needs to be found. Based on the replacement content element (replacement word), the image associated with the first content element "raining" will also be changed, as shown in the figure. A keyword search for the leading sentence "hottest day of the year with 9 hours of sunshine" is made to find close images associated with this weather condition. The replacements in the image are made based on the objects selected to be changed by the user.

As illustrated in the figure, the entire background scenery including clouds and rain drops in the initial image or second content element are removed and substituted by a bright sun image ideally accompanied by a blue sky. Different algorithms known in the art can be used to validate the accuracy of the replacement word and corresponding image. Particularly, known algorithms, such as object detection algorithms, can be used to verify that the replacement word(s) and image(s) match the user-specified context (e.g., "weather condition"). Moreover, an image inpainting technique can be used to overwrite imperfections or repairing defects within the new synthetic image. For example, for a given gap in pixels, the gap is filled with pixels that are the same as, or similar to, neighboring pixels.

After replacing the annotated parts of the at least one document (first content element), a new document can be generated with the first content element replaced with a first replacement (i.e. "raining" replaced with "hottest day of the year with 9 hours of sunshine") and the second content element replaced with a second replacement ("clouds and raindrops" images replaced with "bright sun" image). The new document can be stored into a knowledge base corresponding to the at least one document for use as, for example, a training dataset. Although, other applications can be envisioned for the generated new document. In some instances, the knowledge base can be connected with the database of an AI model or project. The knowledge base can also be enhanced dynamically and in real-time via a network connection to perform an ongoing continuous training.

Therefore, embodiments of the present disclosure allow automatic data augmentation for a machine-learning training knowledge base. Particularly, by using multimodal datasets (e.g., text, images, videos, sound, etc.), high-level data annotations, and performing searches in internal and external data sources, a training knowledge base can be generated and automatically enriched to serve machine-learning models.

Figure 4:
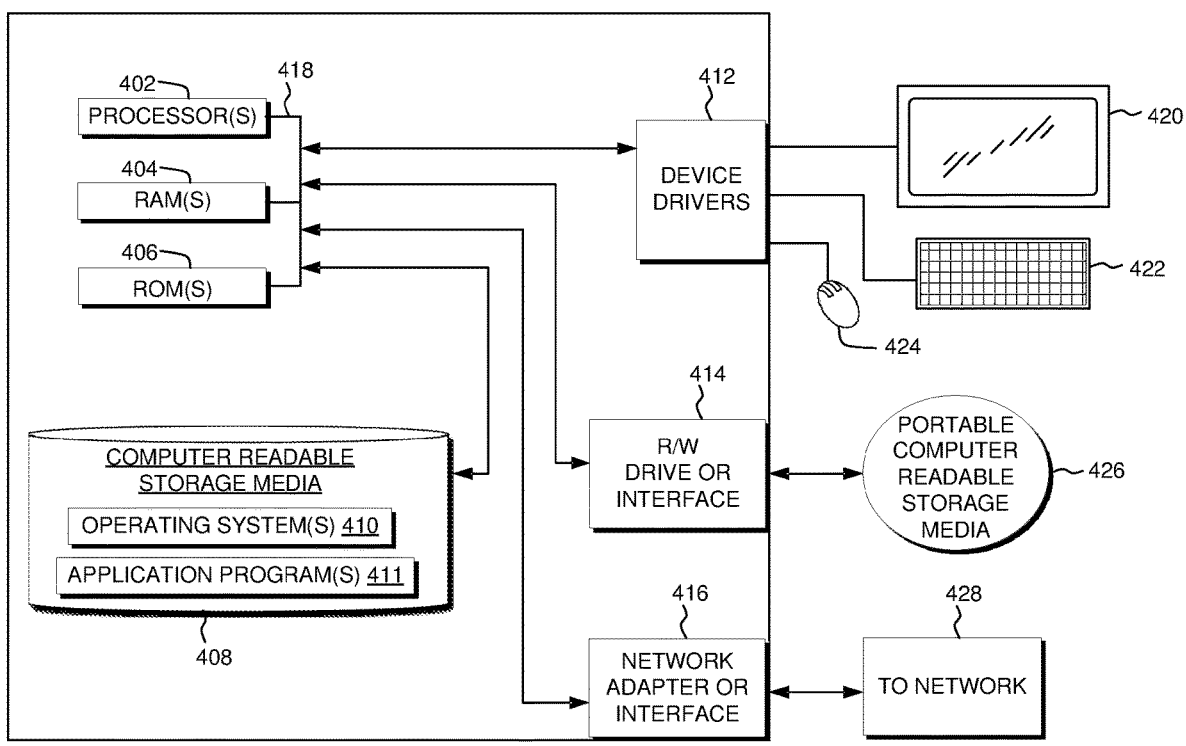
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
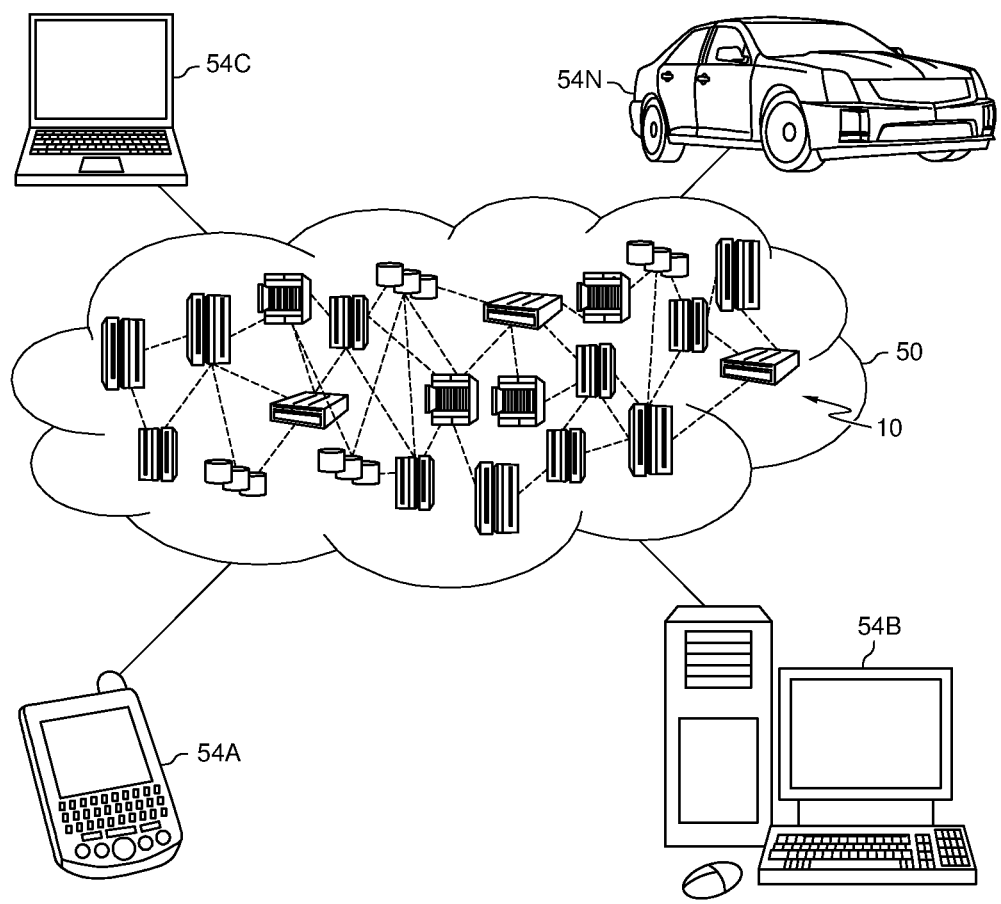
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
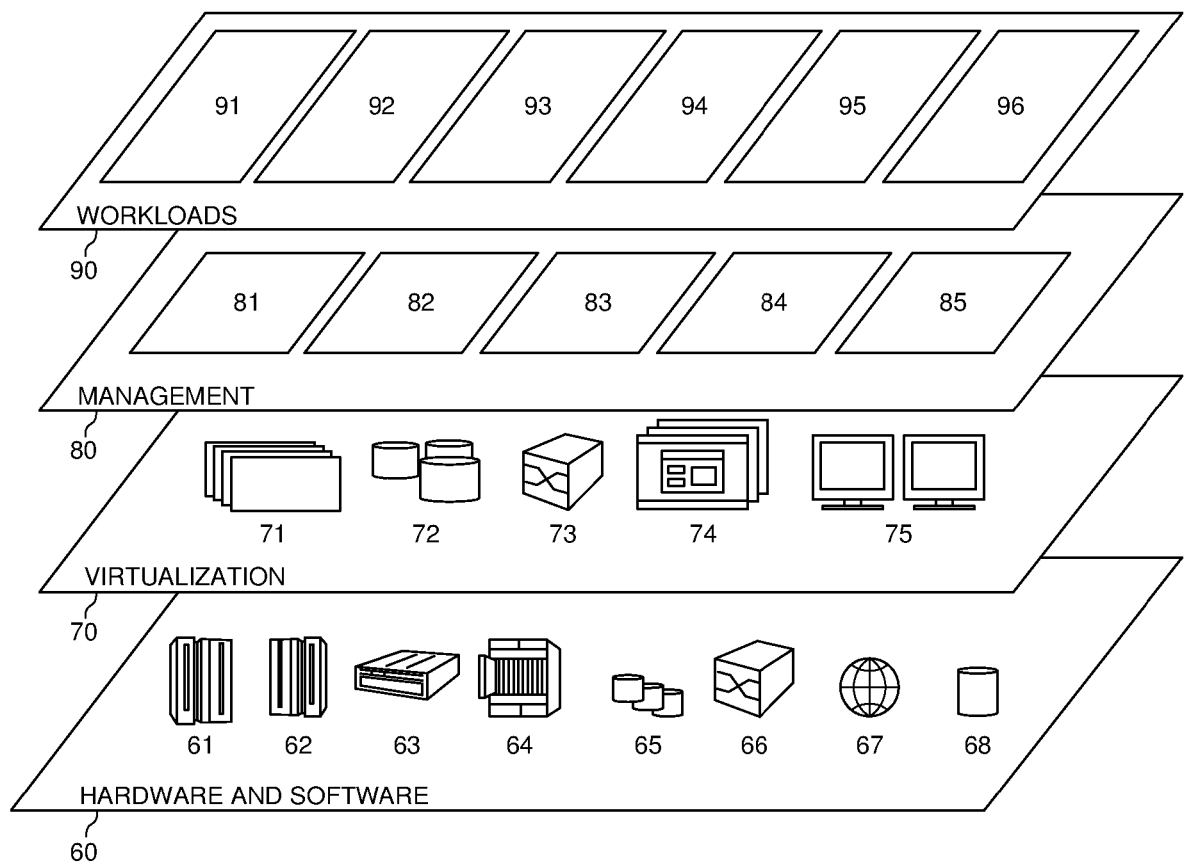
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for dynamic content modification based on a user-specified context 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic content modification, comprising:
    receiving, by one or more processors, input data from a user, the input data comprising at least one document having user-defined annotated parts identifying a first content element associated with a first content type and a second content element associated with a second content type;
    determining, by the one or more processors, a context information associated with the annotated parts;
    extracting, by the one or more processors, the annotated parts and retrieving a plurality of replacement content elements corresponding to the context information associated with the annotated parts from a first data source;
    assigning, by the one or more processors, a similarity score to each of the plurality of replacement content elements and classifying the plurality of replacement content elements based on the similarity score for providing a plurality of replacement options matching the context information;
    retrieving, by the one or more processors, a first replacement for the first content element from the plurality of replacement options, the first replacement comprising a replacement content element with a highest similarity score;
    retrieving, by the one or more processors, a second replacement for the second content element from a second data source based on the first replacement;
    replacing, by the one or more processors, the first content element with the first replacement and the second content element with the second replacement;
    generating, by the one or more processors, a new document with the first content element replaced with the first replacement and the second content element replaced with the second replacement; and
    validating, by the one or more processors, the new document to verify that the first replacement and the second replacement match the context information.

2. The method of claim 1, wherein the second content type is different than the first content type.

3. The method of claim 1, wherein the first content type and the second content type comprise multimodal data including text, images, audio, videos, and the like associated with the context information.

4. The method of claim 1, further comprising:
    storing, by the one or more processors, the new document into a knowledge base corresponding to the at least one document.

5. The method of claim 4, wherein the knowledge base is enhanced dynamically and in real-time via a network connection to perform an ongoing continuous training.

6. The method of claim 1, further comprising:
    receiving, by the one or more processors, an order of representation for the first content element and the second content element, the order of representation comprising a leading variable driving a search and a lagging variable to be updated based on the leading variable, wherein the first content element is the leading variable and the second content element is the lagging variable.

7. A computer system for dynamic content modification, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving, by one or more processors, input data from a user, the input data comprising at least one document having user-defined annotated parts identifying a first content element associated with a first content type and a second content element associated with a second content type;
    determining, by the one or more processors, a context information associated with the annotated parts;
    extracting, by the one or more processors, the annotated parts and retrieving a plurality of replacement content elements corresponding to the context information associated with the annotated parts from a first data source;
    assigning, by the one or more processors, a similarity score to each of the plurality of replacement content elements and classifying the plurality of replacement content elements based on the similarity score for providing a plurality of replacement options matching the context information;
    retrieving, by the one or more processors, a first replacement for the first content element from the plurality of replacement options, the first replacement comprising a replacement content element with a highest similarity score;
    retrieving, by the one or more processors, a second replacement for the second content element from a second data source based on the first replacement;

replacing, by the one or more processors, the first content element with the first replacement and the second content element with the second replacement;

generating, by the one or more processors, a new document with the first content element replaced with the first replacement and the second content element replaced with the second replacement; and validating, by the one or more processors, the new document to verify that the first replacement and the second replacement match the context information.

8. The computer system of claim 7, wherein the second content type is different than the first content type.

9. The computer system of claim 8, wherein the first content type and the second content type comprise multi-modal data including text, images, audio, videos, and the like associated with the context information.

10. The computer system of claim 7, further comprising:
storing, by the one or more processors, the new document into a knowledge base corresponding to the at least one document.

11. The computer system of claim 7, wherein the knowledge base is enhanced dynamically and in real-time via a network connection to perform an ongoing continuous training.

12. The computer system of claim 7, further comprising:
receiving, by the one or more processors, an order of representation for the first content element and the second content element, the order of representation comprising a leading variable driving a search and a lagging variable to be updated based on the leading variable, wherein the first content element is the leading variable and the second content element is the lagging variable.

13. A computer program product for dynamic content modification, comprising:
a computer readable storage medium having program instructions embodied therewith, wherein the computer readable storage medium is not a transitory signal per se, the program instructions executable by a device to cause the device to perform a method comprising:
receiving, by one or more processors, input data from a user, the input data comprising at least one document having user-defined annotated parts identifying a first content element associated with a first content type and a second content element associated with a second content type;

determining, by the one or more processors, a context information associated with the annotated parts;

extracting, by the one or more processors, the annotated parts and retrieving a plurality of replacement content elements corresponding to the context information associated with the annotated parts from a first data source;

assigning, by the one or more processors, a similarity score to each of the plurality of replacement content elements and classifying the plurality of replacement content elements based on the similarity score for providing a plurality of replacement options matching the context information;

retrieving, by the one or more processors, a first replacement for the first content element from the plurality of replacement options, the first replacement comprising a replacement content element with a highest similarity score;

retrieving, by the one or more processors, a second replacement for the second content element from a second data source based on the first replacement;

replacing, by the one or more processors, the first content element with the first replacement and the second content element with the second replacement;

generating, by the one or more processors, a new document with the first content element replaced with the first replacement and the second content element replaced with the second replacement; and validating, by the one or more processors, the new document to verify that the first replacement and the second replacement match the context information.

14. The computer program product of claim 13, wherein the second content type is different than the first content type.

15. The computer program product of claim 14, further comprising:
storing, by the one or more processors, the new document into a knowledge base corresponding to the at least one document.

* * * * *